United States Patent
Hurley (10) Patent No.: US 6,389,204 B1
(45) Date of Patent: May 14, 2002

(54) FIBER OPTIC CABLES WITH STRENGTH MEMBERS AND METHODS OF MAKING THE SAME

(75) Inventor: William C. Hurley, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/867,787

(22) Filed: May 30, 2001

(51) Int. Cl.$^7$ ................................................ G02B 6/44
(52) U.S. Cl. .................................. 385/102; 385/113
(58) Field of Search .......................... 385/102, 58, 70, 385/103, 113

(56) References Cited

U.S. PATENT DOCUMENTS

| | | | |
|---|---|---|---|
| 4,141,622 A | 2/1979 | Beal | 350/96.23 |
| 4,269,024 A | 5/1981 | Ashpole et al. | 57/232 |
| 4,318,588 A | 3/1982 | Zeidler et al. | 350/96.23 |
| 4,374,608 A | 2/1983 | Anderson | 350/96.23 |
| 4,441,787 A | 4/1984 | Lichtenberger | 350/96.23 |
| 4,457,583 A | 7/1984 | Mayr et al. | 350/96.23 |
| 4,479,984 A | 10/1984 | Levy et al. | 427/54.1 |
| 4,534,618 A | 8/1985 | Brüggendieck | 350/96.23 |
| 4,659,174 A | 4/1987 | Ditscheid et al. | 350/96.23 |
| 4,660,926 A | 4/1987 | Mayr et al. | 350/96.23 |
| RE32,436 E | 6/1987 | Hartig | 350/96.23 |
| 4,709,983 A | 12/1987 | Plessner et al. | 350/96.23 |
| 4,740,054 A | 4/1988 | Becker et al. | 350/96.23 |
| 4,778,245 A | 10/1988 | Ueno et al. | 350/96.23 |
| 4,787,702 A | 11/1988 | Khalil | 350/96.23 |
| 4,893,893 A | 1/1990 | Claxton et al. | 350/96.23 |
| 4,969,706 A * | 11/1990 | Hardin et al. | 174/110 FC |
| 5,016,973 A | 5/1991 | Hager et al. | 350/96.23 |
| 5,031,996 A | 7/1991 | Saller et al. | 350/96.23 |
| 5,113,468 A | 5/1992 | Baker | 385/100 |
| 5,148,509 A | 9/1992 | Kannabiran | 385/109 |
| 5,182,784 A | 1/1993 | Hager et al. | 385/128 |
| 5,224,191 A | 6/1993 | Zeidler | 385/111 |
| 5,345,525 A | 9/1994 | Holman et al. | 385/104 |
| 5,389,442 A | 2/1995 | Arroyo et al. | 428/396 |
| 5,408,561 A * | 4/1995 | McCallum et al. | 385/109 |

(List continued on next page.)

OTHER PUBLICATIONS

LSZH™MIC® Cables 2–24 Fibers (Corning Cable Systems Publication © 1995).

CR785 InstantDry™ Reinforcement (Owens Corning Publication No. 5–PL–24943–A, Nov., 1999).

CR785 SoftStrand™ Reinforcement (Owens Corning Publication No. 1–PL–20263–D, Oct., 1997).

CR1700 Optic Cable Reinforcement (Owens Corning Publication No. 1–PL–20755–B, Oct., 1997).

PR735H Experimental Premise Cable Reinforcement (Owens Corning Preliminary Product Data Sheet) No date.

PR600H Experimental Premise Cable Reinforcement (Owens Corning Preliminary Product Data Sheet) No date.

*Primary Examiner*—Brian Sircus
*Assistant Examiner*—Chandrika Prasad
(74) *Attorney, Agent, or Firm*—Michael E. Carroll, Jr.

(57) ABSTRACT

A fiber optic cable and method of manufacturing the same include at least one optical fiber component and at least one strength member disposed adjacent to said at least one optical fiber component. The at least one strength member includes a yarn and a jacket generally surrounding said at least one optical fiber component and said at least one strength member. The yarn includes a coating system having a percentage by weight, based on the dry weight of said yarn, of about 2.0% or less. Other embodiments can include a delta attenuation of about 0.3 dB or less over the range of about 0% to about 1.0% of optical fiber strain, a peak cable core pull-out force of about 1 newton or less, or a space disposed between a cable core and the jacket.

58 Claims, 3 Drawing Sheets

U.S. PATENT DOCUMENTS

| | | | |
|---|---|---|---|
| 5,509,097 A | 4/1996 | Tondi-Resta et al. | 385/113 |
| 5,619,606 A | 4/1997 | Bonicel | 385/102 |
| 5,627,932 A | 5/1997 | Kiel et al. | 385/102 |
| 5,636,307 A | 6/1997 | Cowen et al. | 385/102 |
| 5,689,601 A | 11/1997 | Hager et al. | 385/100 |
| 5,706,382 A | 1/1998 | Smith | 385/102 |
| 5,751,879 A | 5/1998 | Graham et al. | 385/103 |
| 5,822,485 A * | 10/1998 | Nelson et al. | 385/109 |
| 5,920,671 A | 7/1999 | Smith | 385/102 |
| 5,978,536 A | 11/1999 | Brandi et al. | 385/102 |
| 6,088,499 A | 7/2000 | Newton et al. | 385/112 |
| 6,178,278 B1 | 1/2001 | Keller et al. | 385/109 |
| 6,185,351 B1 * | 2/2001 | Daneshvar et al. | 385/114 |
| 6,205,277 B1 | 3/2001 | Mathis et al. | 385/106 |
| 6,229,944 B1 | 5/2001 | Yokokawa et al. | 385/114 |
| 6,259,844 B1 * | 7/2001 | Logan et al. | 385/113 |

* cited by examiner

FIBER OPTIC CABLES WITH STRENGTH MEMBERS AND METHODS OF MAKING THE SAME

FIELD OF THE INVENTION

The present invention relates generally to fiber optic cables and, more particularly, to fiber optic cables having at least one strength member.

BACKGROUND OF THE INVENTION

Fiber optic cables include optical fibers that are capable of transmitting voice, video, and data signals. Fiber optic cables have advantages over electrical voice, video and data signal carriers, for example, increased data capacity. As businesses and households demand increased data capacity, fiber optic cables can eventually displace electrical voice, video, and data signal carriers. This demand for fiber optic cables has led to shortages of fiber optic cable materials.

Aramid fibers are cable materials that can serve several functions, such as: providing tensile strength to the fiber optic cable; cushioning the optical fibers from compression and impact loads; covering the optical fibers during the extrusion of the outer jacket to prevent the optical fibers from sticking to the extruded outer jacket; and binding the optical fibers together to prevent relative movement. Aramid fibers can, however, be expensive.

In addition to being cost effective, fiber optic cables should be simple to manufacture and have a relatively small diameter. An example of a reduced diameter indoor fiber optic cable is disclosed in U.S. Pat. No. 5,627,932, which is incorporated herein by reference. This fiber optic cable requires a tight buffered optical fiber or fibers disposed within a layer of loose aramid fibers, more specifically Kevlar® aramid fibers, which are surrounded by an outer jacket. This cable can be made of flame retardant materials for riser or plenum applications; however, the cable has disadvantages. For example, the cable requires a significant amount of aramid fibers that are typically expensive, thereby increasing cable manufacturing costs.

Fiber optic cables should also have acceptable levels of attenuation. An example of a fiber optic cable designed to prevent attenuation as a result of the manufacturing process is disclosed in U.S. Pat. No. 5,822,485, which is incorporated herein by reference. This fiber optic cable or cable element requires a jacket surrounding an optical fiber and aramid fibers, such as Kevlar®, without an intended lay. The manufacturing process requires that the tension applied to the aramid fibers during manufacturing does not exceed the tension applied to the optical fiber during manufacturing. Although this fiber optic cable is designed to prevent attenuation induced during the manufacturing process, this design has several disadvantages. For example, the cable requires a significant amount of aramid fibers, which if available, are expensive and increase cable manufacturing costs.

Conventional textile glass or other fiberglass components (hereinafter conventional glass components), for example CR-785D and CR-785G, which have essentially the same glass composition with respect to each other, but different coatings, are commercially available from Owens-Corning Inc. Conventional glass components have been developed for outdoor fiber optic cables but have had limited application in premises fiber optic cables. Additionally, these conventional glass components are relatively stiff and have a lower tensile modulus when compared with aramid fibers of similar size. Another conventional glass component used in outdoor fiber optic cables is a 7065 denier yarn. This standard conventional glass component was selected based on tensile strength, more specifically, one strand of 7065 denier conventional glass was typically selected as the standard because it has the same tensile strength as one strand of a 2450 denier aramid fiber.

The present inventor has discovered that a factor limiting the use of conventional glass components in premises fiber optic cables is the incompatibility of these fiberglass components with certain optical fibers, more specifically, 50/125 µm tight buffered optical fibers. The research of the present inventor has shown that 50/125 µm optical fibers generally have increased bend sensitivity compared with other optical fibers, such as 62.5/125 µm tight buffered optical fibers. Consequently, when conventional glass components were employed in fiber optic cables having 50/125 µm tight buffered optical fibers, testing revealed unacceptably high levels of attenuation.

Figure 1:
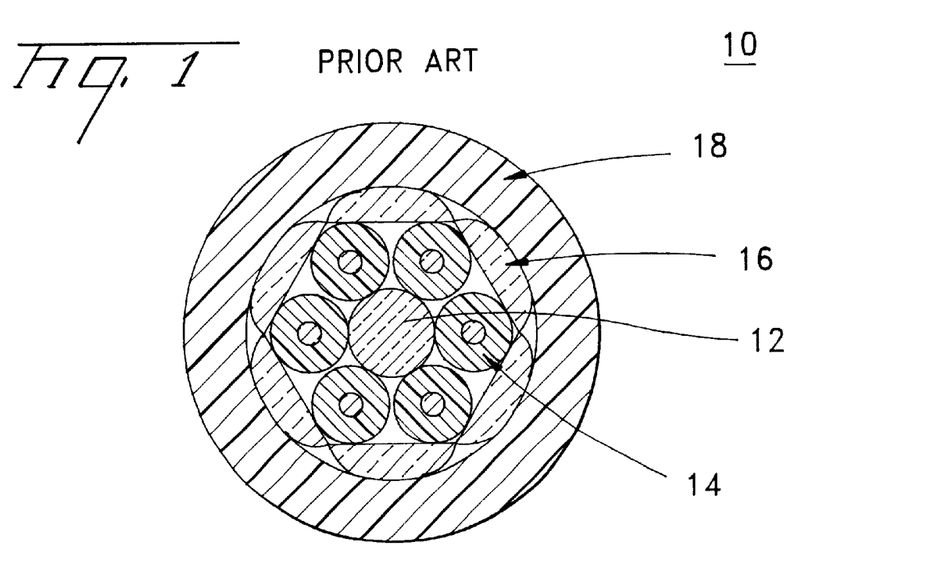
FIG. 1 is a cross-sectional view of a prior art premises cable.

FIG. 1 (prior art) is a cross-sectional view of a fiber optic premises cable 10. Cable 10 comprises a plurality of 50/125 µm tight buffered optical fibers 14 stranded around a central strength member 12, which can include glass reinforced plastic (GRP), plastics or aramid fibers. Interposed between optical fibers 14 and an outer jacket 18 is a required layer of aramid fibers 16, which are stranded around optical fibers 14. Outer jacket 18 surrounds and contacts layer 16. This contact results in a force between the inner surface of outer jacket 18 and the outer surface of layer 16 holding components 12, 14 and 16 in place.

Cable 10 exhibits acceptable performance characteristics when layer 16 comprises aramid fibers, which are relatively soft and flexible. However, the present invention has discovered that cable 10 exhibits unacceptable levels of attenuation and/or unacceptable performance characteristics if layer 16 comprises conventional glass components. The unacceptable characteristics are believed to be due to the fact that conventional glass components are relatively hard and stiff when compared with aramid fibers of the same size.

ASPECTS OF THE INVENTION

An aspect of the present invention includes a fiber optic cable having at least one optical fiber component and at least one strength member disposed adjacent to the at least one optical fiber component. The at least one strength member includes a yarn with a coating system having a percentage by weight, based on the dry weight of the yarn, of about 2.0% or less. A jacket generally surrounds the at least one optical fiber component and the at least one strength member. Additionally, the cable can be riser or plenum rated.

Another aspect of the present invention includes a fiber optic cable having at least one optical fiber component stranded around a central member. A plurality of strength members forming a first layer stranded around the at least one optical fiber component. The plurality of strength members includes at least one yarn with a coating system having a percentage by weight, based on the dry weight of the yarn, of about 2.0% or less. A jacket generally surrounds the at least one optical fiber component, central member and the plurality of strength members. The central member, the at least one optical fiber component and the first layer comprising a cable core having a peak pull-out force of about 1 newton or less. Additionally, the cable can be riser or plenum rated.

A further aspect of the present invention includes a fiber optic cable including at least one tight-buffered optical fiber component stranded around a central member. A plurality of strength members forming a first layer stranded around the at least one optical fiber component, the plurality of strength members includes at least one yarn. The yarn includes a coating system having a percentage by weight, based on the dry weight of the yarn, of about 2.0% or less. A space having a range of about 0.03 millimeters to about 1.0 millimeters, at the time of extrustion, is disposed between the plurality of strength members and a jacket generally surrounding the at least one optical fiber component, central member and the plurality of strength members. Additionally, the cable can be riser or plenum rated.

A still further aspect of the present invention includes a method of manufacturing a fiber optic cable. The method includes paying off at least one optical fiber component and at least one strength member. The at least one strength member includes at least one yarn. The yarn includes a coating system having a percentage by weight, based on the dry weight of the yarn, of about 2.0% or less. A cable core defined by placing the at least one strength member adjacent to the at least one optical fiber component. The method also includes extruding a jacket around the cable core. Additionally, the method of manufacture can include a tube-on extrusion process that may provide a space at the time of extrusion.

Yet another aspect of the present invention includes a fiber optic cable including at least one optical fiber component and at least one strength member disposed adjacent to the at least one optical fiber component. The at least one strength member can include a yarn. The yarn includes a coating system having a percentage by weight, based on the dry weight of the yarn, of about 2.0% or less. A jacket generally surrounds the at least one optical fiber component and the at least one strength member. The fiber optic cable includes a delta attenuation of about 0.3 dB or less over the range of about 0% fiber strain to about 1.0% fiber strain. Additionally, the jacket of the cable can be formed of a flame-retardant material.

Still another aspect of the present invention includes a fiber optic cable including at least one optical fiber component and at least one strength member disposed adjacent to said at least one optical fiber component. A jacket generally surrounds the at least one optical fiber component and the at least one strength member. The cable includes a delta attenuation of about 0.3 dB or less over the range of about 0% fiber strain to about 1.0% fiber strain. The said at least one optical fiber component and said at least one strength member comprising a cable core having a peak pull-out force of about 1 newton or less.

DETAILED DESCRIPTION OF THE INVENTIONS

Figure 2:
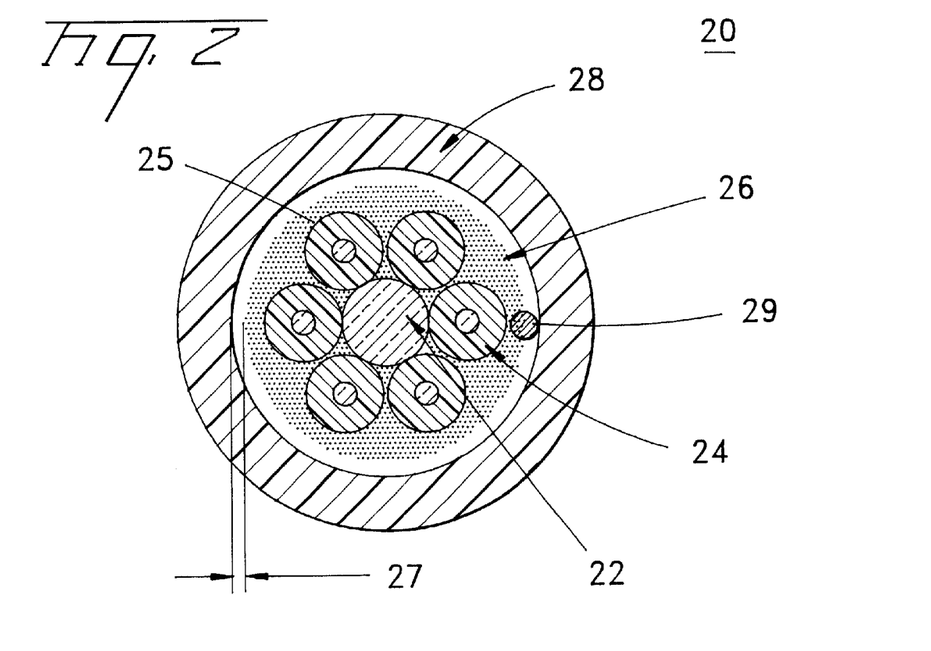
FIG. 2 is a cross-sectional view of a fiber optic cable, at the time of extrusion, in accordance with the present invention.

A fiber optic cable 20 according to an embodiment of the present invention is depicted in FIG. 2. Fiber optic cable 20 includes a plurality of optical fiber components 24 that are stranded or longitudinally disposed about a central member 22. Interposed between optical fiber components 24 and a jacket 28 is a layer 25 of stranded yarns 26 substantially surrounding optical fiber components 24. The present invention can include a space 27, at the time of extrusion, disposed between a cable core 80 and a jacket 28 allowing relative movement among layer 25, yarns 26, optical fiber components 24 and jacket 28, for example, during cable bending and/or thermal variation.

Yarns used in cables according to the present invention are softer and have increased flexibility compared with the conventional glass components used in previous outdoor fiber optic cables. Yarns 26 of the present invention are substantially not conventional glass components, but, rather can include similar glass compositions having different coatings. It is to be understood that at least one yarn 26 of the present invention may be used in combination with conventional optical cable strength components providing an optical cable strength system. Conventional glass components 16 include a coating having a relatively high percentage by weight based on the dry weight of conventional glass components. An example of a conventional glass component used in fiber optic cables having a coating including a thermoplastic polyurethane latex, acrylic latex and water disclosed in U.S. Pat. No. 5,182,784, and is incorporated herein by reference. More specifically, conventional glass components include coatings with percentages by weight, based on the dry weight of the conventional glass component, ranging from 2.1% or more. For example, U.S. Pat. No. 5,689,601, incorporated herein by reference, discloses a conventional glass component having a first coating and a second coating. More specifically, the first coating is a binding agent, in an amount of 2% to 20% by dry weight based on the dry weight of the conventional glass component, and the second coating is a water-blocking agent, in an amount of 0.1% to 10% by dry weight based on the weight of the conventional glass component.

The relatively high percentage coating by weight of conventional glass components 16 tends to cause individual fibers of the conventional glass components to be matted together forming a stiff matrix, having a straw-like texture (FIG. 1). The inventor of the present invention has discovered that this stiff matrix inhibits relative movement among conventional glass components, optical fibers and/or the cable jacket, which may result in undesirable levels of optical attenuation. However, a coating system on yarns 26 of the present invention allows the individual yarns to be finer and softer due to a relatively low percentage by weight, based on the dry weight of the yarn, of the coating system. Yarns 26 generally include a plurality of individual hairs that may number into the hundreds or more. It is to be understood that the coating system can include one or more individual coatings. The inventor of the present invention has discovered that substantially softer and less coupled characteristics of the present invention allows individual yarns 26 and/or optical fiber components 24 to migrate and reposition within the cable resulting in improved optical performance. Yarns 26 of the present invention can include coating systems, generally thermoplastic or thermoset materials that can provide a variety of characteristics, for example, anti-abrasion, anti-static, binding and/or water-blocking characteristics. Moreover, yarns 26 used in cables of the present invention include coating systems having percentages by weight, based on the dry weight of the yarns 26, generally ranging from about 0% to about 2.0%, preferably, percentages by weight ranging from about 0.3% to about 1.8%, more preferably, percentages by weight ranging from about 0.5% to about 1.5%, and most preferably, percentages by weight ranging from about 0.7% to about 1.0%. Yarns 26 can include e-glass yarns such as PR-600H and PR-735H available commercially from Owens-Corning Inc, but can include materials such as s-glass, carbon fibers, boron fibers or silicon carbide.

FIG. 2 illustrates six optical fiber components 24, such as 50/125 μm tight-buffered optical fibers, which are S-Z stranded around central member 22. However, components 24 can be stranded, with or without a central member, or longitudinally disposed and can include other sizes of tight-buffered optical fibers, for example, single-mode, 62.5/125 μm, and/or 100/140 μm multi-mode components, ribbonized fibers or loose fibers. An example of a fiber optic cable having a non-round cross-section with ribbonized optical fibers is disclosed in U.S. application Ser. No. 09/107,676 filed on Jun. 30, 1998, which is incorporated herein by reference. Each optical fiber preferably includes a silica-based core that is operative to transmit light and is surrounded by a silica-based cladding having a lower index of refraction than the core. A soft primary coating surrounds the cladding, and a relatively rigid secondary coating surrounds the primary coating. Optical fiber components 24 are available commercially, for example, from Corning Inc.

Central member 22 is most preferably formed of a high strength dielectric material; e.g., glass-reinforced plastic, but it can be manufactured from any suitable dielectric, conductive or semi-conductive material. Such materials include, for example, plastics, GRP, aramid fibers, carbon fibers, conventional glass components or yarns of the present invention. Cables according to the present invention are mechanically robust; for example, cable 20 can carry a tensile load of about 150 lbs. or more without a significant delta attenuation. Moreover, central member 22 can be a material that preferably can withstand a predetermined fraction of the tensile load of cable 20. Additionally, cable 20 has a minimum bend radius of about ten centimeters or less. Moreover, at the predetermined tensile load optical fiber components 24 and/or cable 20 can have a predetermined delta attenuation and a fiber strain in the range of essentially about 0% to about 1.0%, more preferably between essentially about 0% and about 0.7% and most preferably between essentially about 0.3% and about 0.6%.

Embodiments of the present invention include layer 25, which can include six 5200 denier glass yarns 26, preferably counter-hellically stranded, around optical fiber components 24. Layer 25 preferably preserves optical performance within desirable ranges and can include more or less than six yarns 26. More specifically, layer 25 can operate to provide tensile strength, cushion compression and impact loads, cover the optical fiber components 24 during extrusion of jacket 28 and/or bind the optical fiber components 24 to inhibit relative axial movement. Preferably, layer 25 is generally interposed between central member 22 and jacket 28, more preferably, layer 25 is generally disposed between optical fiber components 24 and jacket 28. Most preferably, layer 25 substantially surrounds optical fiber components 24. Yarns 26 of layer 25 can include a helical lay length between 300 millimeters and 600 millimeters, but yarns 26 can be longitudinally disposed.

Embodiments can include space 27; preferably, at least partially disposed between jacket 28 and layer 25. Space 27 operates to allow radial movement of fiber optic components 24, yarns 26 and/or layer 25 when, for example, cable 20 is subjected to bending loads and/or thermal variations. Stated another way, fiber optic component 24, yarns 26 and/or layer 25 are loosely contained within jacket 28 allowing some room for repositioning of these components in space 27. Space 27 has a range of about 0 millimeters to about 1 millimeter at ambient temperature at the time of extrusion and is generally uniformly distributed around the circumference between a outer surface of layer 25 and an inner surface of jacket 28. However, after extrusion, space 27 is loosely filled by layer 25. Preferably the radial thickness of space 27 at the time of extrusion is about 0.03 millimeters to about 0.8 millimeters, more preferably, about 0.05 millimeters to about 0.5 millimeters, most preferably about 0.2 millimeters. If space 27 is too small, undesirable attenuation can result when cable 20 is subject to bending. On the other hand, if space 27 is too large cable 20 will not have an adequate pull-out force to allow for proper installation characteristics. Peak pull out force can be tested, for example, with a 600 millimeter cable sample. A 100 millimeter of length of a jacket is removed from an end the cable sample exposing a cable core. The jacket, free from the cable core, at an opposing end is secured and the cable core is pulled from the cable jacket while measuring the peak pull-out force. In general, peak pull-out force of cable 20 is about 1 newton or less, preferably 0.8 newtons or less, however pull-out forces may vary based upon specific cable designs.

Jacket 28 generally can provide environmental and/or impact protection. Jacket 28 generally surrounds central member 22, optical fiber components 24, layer 25 and/or space 27. In one embodiment, jacket 28 is formed of flame-retardant plastics, such as PVC, flame-retarded polyethylene or low smoke zero halogen materials, but can include other materials, for example, polypropylene. The flame resistance can be specified by, for example, UL Standard 1666 for riser-rated cables or by UL Standard 910 for plenum-rated cables. For creation of space 27, a tube-on extrusion process can be used to apply jacket 28, which generally has a thickness range of about 0.5 millimeters to about 2.0 millimeters, more preferably about 0.7 millimeters to about 1.5 millimeters, most preferably about 0.9 millimeters to about 1.2 millimeters.

Cable 20 can include one or more ripcords 29 disposed between central member 22 and jacket 28, more preferably, disposed between optical fiber component(s) 24 and jacket 28. Ripcord 29 allows the craftsperson to easily remove a section of jacket 28. Additionally, an interfacial layer 23 can be disposed between central member 22 and jacket 28. Interfacial layer 23 can include a powder, such as a talc powder, a thin film, a tape, a sheet, or a water-swellable substance. Fiber optic cable 20 can have a range of outer diameters from about 3 millimeters and to about 12 millimeters or more, but most preferably the outer diameter is about 6 millimeters.

Figure 3:
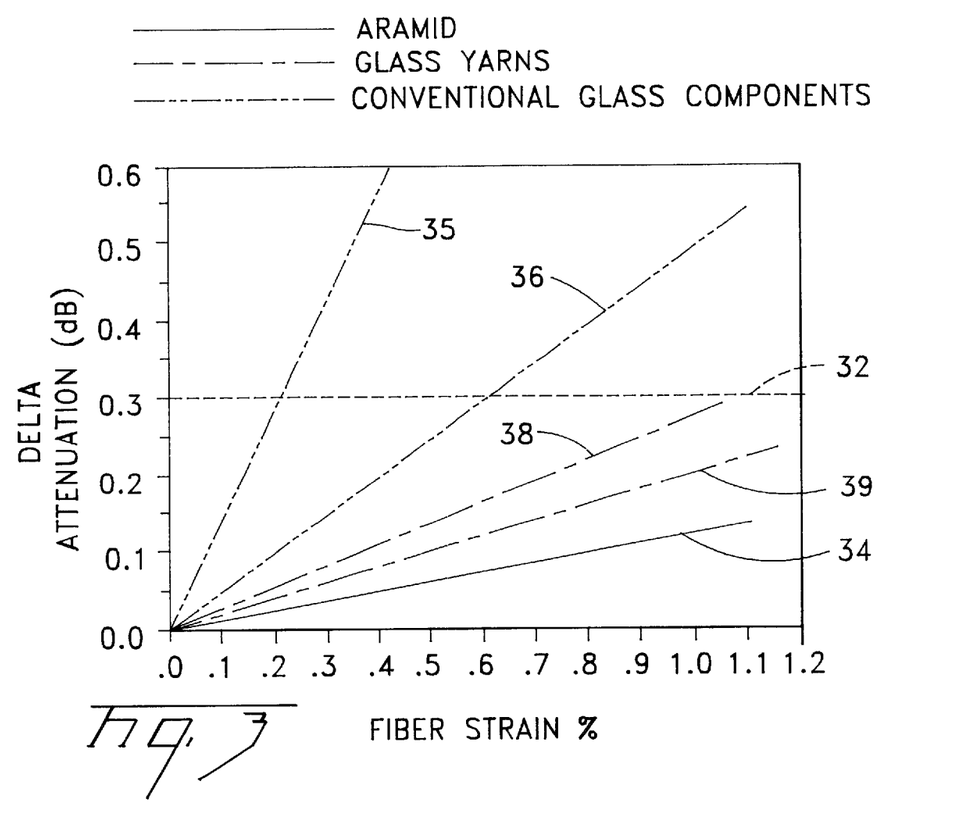
FIG. 3 is graph roughly indicating attenuation associated with optical fiber strain in an exemplary 50 μm tight-buffered fiber optic cables employing various materials.

FIG. 3 illustrates the performance characteristics of four different materials tested in the cable embodiments of FIGS. 1 and 2 having 50 μm tight-buffered optical fiber components. A dashed horizontal line 32 represents an exemplary upper limit of an acceptable delta attenuation range, which is about 0.3 dB. Delta attenuation is generally a method of measuring an attenuation loss of optical fibers in a cable due to stresses and/or strains applied to the cable while separating out the inherent attenuation losses in the optical fibers, connectors and/or splices. In general, an optical fiber has a certain attenuation loss due to characteristics inherent in the optical fiber, for example, reflectivity or imperfections in the fiber. To determine delta attenuation a baseline attenuation loss from the fiber, connectors and/or splices is subtracted from an attenuation loss at a particular tensile stress and/or strain. By way of example, a 200 meter length of cable is wrapped around a set of mandrels and a baseline attenuation loss is measured in a relaxed state, then a load is applied to the same cable through the mandrels to a predetermined stress and/or strain and the attenuation loss is measured. The difference between these two measurements defines delta attenuation.

Curve 34 represents the performance characteristics of aramid fibers in the cable of FIG. 1 and is used as a benchmark for comparison purposes. Curves 35 and 36 represent conventional glass components in the cable design of FIG. 2, respectively, as illustrated curves 35 and 36 have different slopes, however both materials exceed the acceptable attenuation range. Curve 38 represents an exemplary material of the present invention in the cable design of FIG. 2, for example, PR-600H, as illustrated curve 38 has a slope greater than the slope of curve 34, nonetheless curve 38 remains in the acceptable delta attenuation range below a fiber strain value of about 1.2%. Moreover, curve 38 has a delta attenuation of about 0.2 dB or less over the range of about 0% fiber strain to about 0.6% fiber strain. To date an exemplary material, PR-735H, for use in cables of the present invention has not been tested, but is believed to be represented by theoretical strain-delta attenuation curve 39. As illustrated curve 39 has a slope disposed between the slope of curve 34, representing aramid fibers, and the slope of curve 38 and remains in the acceptable attenuation range for the range of acceptable fiber strains. It is to be understood that the yarns of the present invention can have applications in any fiber optic cable and are not intended to be limited to the cable designs disclosed.

Figure 4:
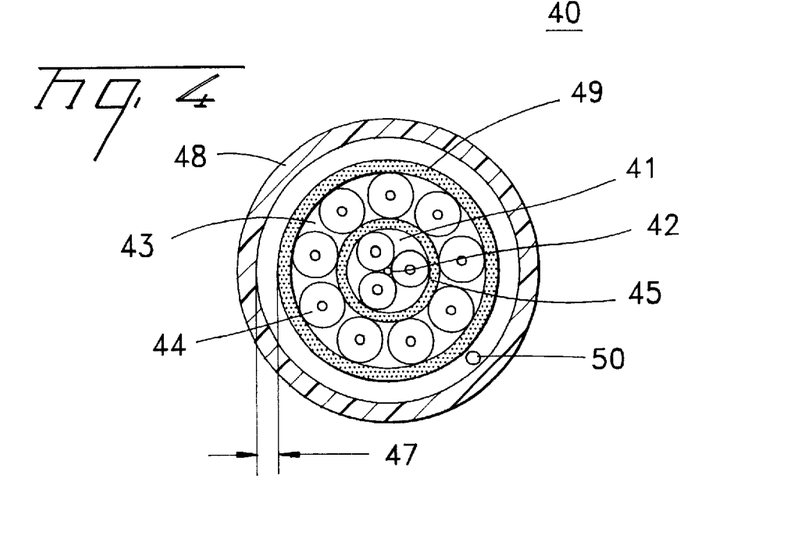
FIG. 4 is a cross-sectional view of a fiber optic cable, at the time of extrusion, in accordance with another embodiment of the present invention.

Fiber optic cable 20 is advantageous because, for example, it is a reliable and low cost cable. However, fiber optic cables according to the present invention can take various forms. As shown in FIG. 4, for example, fiber optic cable 40 is another embodiment of the present invention. As described in conjunction with the embodiments of FIG. 2, fiber optic cable 40 includes twelve optical fiber components 44. A first group 41 of fiber optic components 44 includes three, tight-buffered optical fiber components, preferably S-Z stranded, around a central member 42, for example, a single 5200denier glass yarn. Interposed between first group 41 of fiber optic components 44 and a second group 43 of fiber optic components 44 is a first layer 45 of yarns. First layer 45 can include about two yarns to about ten or more yarns, for example, six 5200 denier glass yarns, preferably, stranded clockwise around first group 41 of fiber optic components 44, but can be longitudinally disposed. Second group 43 of fiber optic components 44 includes nine tight-buffered optical fiber components, preferably S-Z stranded, around first layer 45 of yarns. A second layer 49 of yarns, can include about two to about eighteen or more yarns, for example, ten 5200 denier glass yarns, preferably stranded counter-helically around the second group 43 of fiber optic components 44, but can be longitudinally disposed. Interposed between the second layer. 49 of yarns and a jacket 48 can be a space 47, for example, about 0.2 millimeters in radial thickness. The embodiment in FIG. 4 can include one or more ripcords 50 disposed between the central member 42 and jacket 48 and/or an interfacial layer as described herein.

Manufacture

Figure 5:
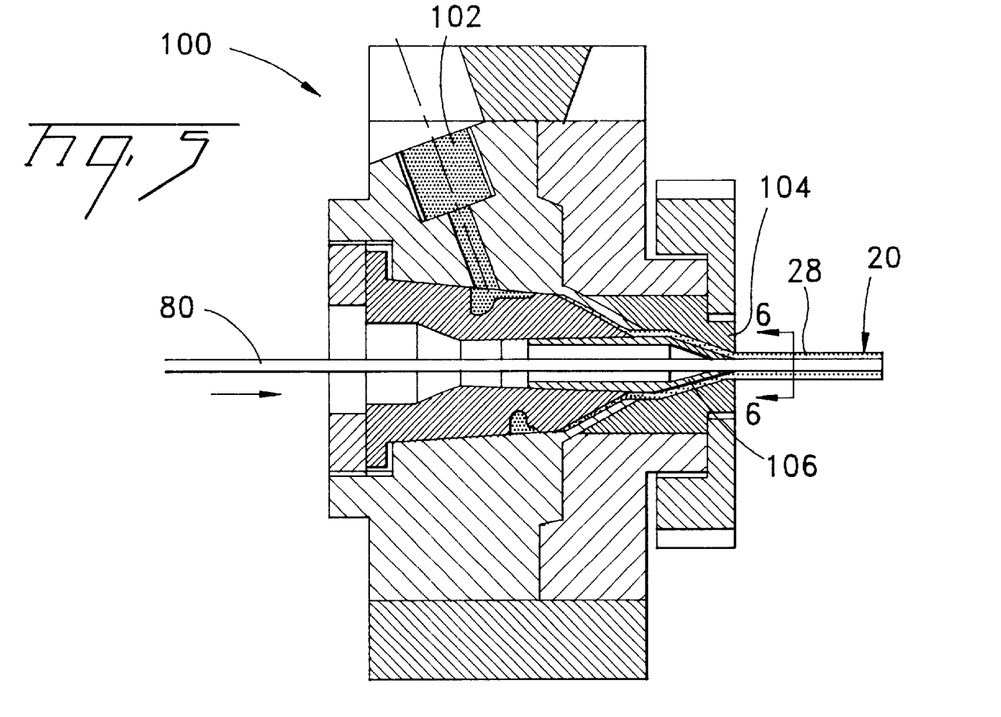
FIG. 5 is a schematic, cross-sectional view of an exemplary extrusion tool for manufacturing fiber optic cables according to the present invention.
Figure 6:
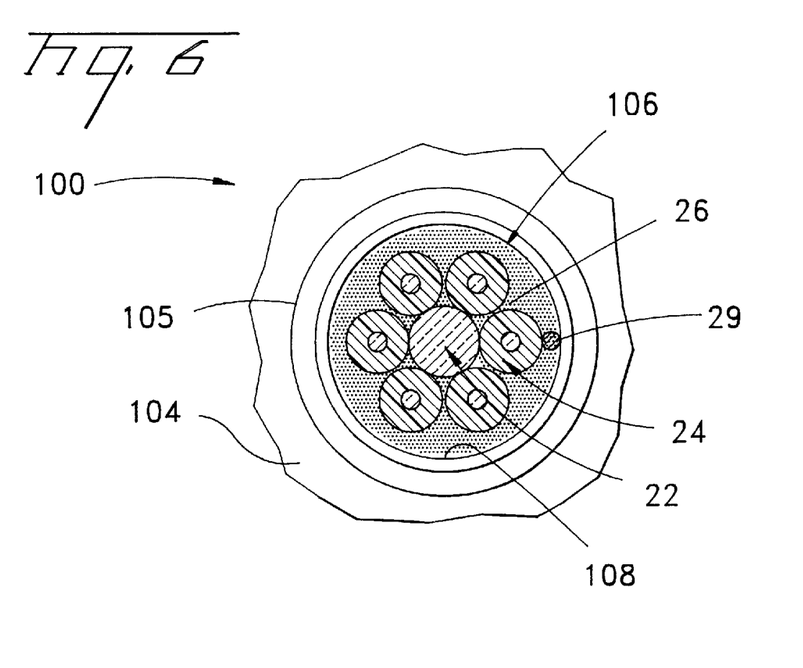
FIG. 6 is an enlarged view of the exit face of the extrusion tooling taken at line 6—6 of FIG. 5.

The manufacture of cables according to the present invention can be accomplished by operation of exemplary extrusion tooling 100 (FIGS. 5–6). Extrusion tooling 100 is operative to extrude jacketing material 28 about a core 80, by way of example, core 80 includes a central member 22, at least one optical fiber component 24 and a layer 26 (FIG. 6). As core 80 is fed into extrusion tooling 100 (FIG. 5), a jacketing compound, e.g., a suitable flame-retardant thermoplastic, is supplied under suitable temperature and pressure conditions to an inlet port 102. The jacketing compound is channeled toward a die 104 and a tip 106. The jacketing compound surrounds core 80 thereby forming jacket 28 therearound to complete cable 20.

FIG. 5 schematically shows an exit face of extrusion tooling 100 with the jacketing compound or melt removed for illustration purposes. In one embodiment of the present invention, tip 106 includes an orifice 108 defined within the end portion of tip 106 for receiving core 80. As illustrated in FIG. 6, core 80 can include components 22, 24, 26 and/or 29. However, core 80 can exclude various cable components, for example central member 22 or ripcord 29, but at a minimum core 80 includes at least one optical fiber component and at least one strength member. More particularly, tip 106 can include a round section that generally complements core 80, however other shapes can be employed. Tip 106 generally includes a diameter greater than the respective diameter of core 80. Die 104 includes a die orifice 105 that defines the outer surface of jacket 28. A tube-on extrusion results in a jacket 28 with a generally round cross-section providing space 27, as exemplified by the embodiment of FIG. 2. In the tube-on process, the end of tip 106 is generally flush with the face of die 104.

Additionally, a pressure extrusion process or a tubing-on plus vacuum draw down process can be used in cable designs where space 27 is not desired. In a pressure extrusion process, the end of tip 106 is generally recessed from the face of die 104. Whereas in the tubing-on plus vacuum draw down process, the end of tip 106 is generally flush with the face of die 104. In general, the die orifice 105 used for the pressure extrusion process is relatively smaller than the die orifice 105 used for the tubing-on plus vacuum draw down process.

Many modifications and other embodiments of the present invention, within the scope of the appended claims, will become apparent to a skilled artisan. For example, a cable can include two to thirty-six fiber optic components or more in a plurality of groups or a single group. Moreover, a cable of the present invention could also be employed as a unit of a break-out cable. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. The invention has been described with reference to premises cable designs but the inventive concepts of the present invention are applicable to other cable types as well.

That which is claimed:

1. A fiber optic cable, comprising:

at least one optical fiber component;

at least one strength member disposed adjacent to said at least one optical fiber component, said at least one strength member comprising a yarn;

said yarn including a coating system having a percentage by weight, based on the dry weight of said yarn, of about 2.0% or less; and a jacket generally surrounding said at least one optical fiber component and said at least one strength member.

2. The fiber optic cable according to claim 1, said yarn including a coating system having a range of percentages by weight of about 0.3% to about 1.8%.

3. The fiber optic cable according to claim 1, said yarn including a coating system having a range of percentages by weight of about 0.5% to about 1.5%.

4. The fiber optic cable according to claim 1, said yarn including a coating system having a range of percentages by weight of about 0.7% to about 1.0%.

5. The fiber optic cable according to claim 1, further comprising a space, at the time of extrusion, interposed between said at least one strength member and said jacket.

6. The fiber optic cable according to claim 4, said space having a range of about 0.03 millimeters to about 0.8 millimeters.

7. The fiber optic cable according to claim 4, said space having a range of about 0.05 millimeters to about 0.5 millimeters.

8. The fiber optic cable according to claim 4, said space being about 0.2 millimeters.

9. The fiber optic cable according to claim 1, said yarn further comprising a glass yarn.

10. The fiber optic cable according to claim 1, said at least one optical fiber component being selected from a tight-buffered fiber, an optical fiber ribbon or loose optical fibers.

11. The fiber optic cable according to claim 1, said at least one optical fiber component and said at least one strength member comprising a cable core having a peak pull-out force of about 1 newton or less.

12. A fiber optic cable according to claim 1, said cable further comprising an interfacial layer disposed within said jacket.

13. A fiber optic cable, comprising:
    at least one optical fiber component stranded around a central member;
    a plurality of strength members forming a first layer stranded around said at least one optical fiber component, said plurality of strength members comprising at least one yarn;
    said yarn including a coating system having a percentage by weight, based on the dry weight of said yarn, of about 2.0% or less;
    a jacket generally surrounding said at least one optical fiber component, central member and said plurality of strength members; and
    said central member, said at least one optical fiber component and said first layer comprising a cable core having a peak pull-out force of about 1 newton or less.

14. The fiber optic cable according to claim 13, said yarn including a coating system having a range of percentages by weight of about 0.3% to about 1.8%.

15. The fiber optic cable according to claim 13, said yarn including a coating system having a range of percentages by weight of about 0.5% to about 1.5%.

16. The fiber optic cable according to claim 13, said yarn including a coating system having a range of percentages by weight of about 0.7% to about 1.0%.

17. The fiber optic cable according to claim 13, further comprising a space, at the time of extrusion, interposed between said plurality of strength members and said jacket.

18. The fiber optic cable according to claim 17, said space having a range of about 0.03 millimeters to about 0.8 millimeters.

19. The fiber optic cable according to claim 17, said space having a range of about 0.05 millimeters to about 0.5 millimeters.

20. The fiber optic cable according to claim 17, said space being about 0.2 millimeters.

21. The fiber optic cable according to claim 13, said yarn further comprising a glass yarn.

22. The fiber optic cable according to claim 13, said jacket is formed of a flame-retardant material.

23. The fiber optic cable according to claim 13, further comprising optical fiber components stranded around said plurality of strength members forming a first layer; a plurality of strength members forming a second layer stranded around said optical fiber components stranded around said first layer.

24. The fiber optic cable according to claim 13, said cable being a premises cable.

25. The fiber optic cable according to claim 13, said cable further comprising an interfacial layer disposed between said central member and said jacket.

26. The fiber optic cable according to claim 13, said at least one optical fiber component being selected from a tight-buffered fiber, an optical fiber ribbon or loose optical fibers.

27. A fiber optic cable, comprising:
    at least one tight-buffered optical fiber component stranded around a central member;
    a plurality of strength members forming a first layer stranded around said at least one optical fiber component, said plurality of strength members comprising at least one yarn;
    said yarn including a coating system having a percentage by weight, based on the dry weight of said yarn, of about 2.0% or less; and
    a space having a range of about 0.03 millimeters to about 1.0 millimeters, at the time of extrusion, disposed between said plurality of strength members and a jacket generally surrounding said at least one optical fiber component, central member and said plurality of strength members.

28. The fiber optic cable according to claim 27, said yarn including a coating system having a range of percentages by weight of about 0.3% to about 1.8%.

29. The fiber optic cable according to claim 27, said yarn including a coating system having a range of percentages by weight of about 0.5% to about 1.5%.

30. The fiber optic cable according to claim 27, said yarn including a coating system having a range of percentages by weight of about 0.7% to about 1.0%.

31. The fiber optic cable according to claim 27, said space having a range of about 0.05 millimeters to about 0.8 millimeters.

32. A fiber optic cable according to claim 27, said space having a range of about 0.1 millimeters to about 0.5 millimeters.

33. The fiber optic cable according to claim 27, said yarn further comprising a glass yarn.

34. The fiber optic cable according to claim 27, said cable having a peak pull-out force of about 1 newton or less.

35. The fiber optic cable according to claim 27, said cable further comprising an interfacial layer disposed between said central member and said jacket.

36. A method of manufacturing a fiber optic cable comprising:
    paying off at least one optical fiber component and at least one strength member, said at least one strength member including at least one yarn, said yarn including a coating system having a percentage by weight, based on the dry weight of said yarn, of about 2.0% or less;

defining a cable core by placing said at least one strength member adjacent to said at least one optical fiber component; and extruding a jacket around said core.

37. The method of manufacturing a fiber optic cable according to claim 36, said yarn including a coating system having a range of percentages by weight of about 0.3% to about 1.8%.

38. The method of manufacturing a fiber optic cable according to claim 36, said yarn including a coating system having a range of percentages by weight of about 0.5% to about 1.5%.

39. The method of manufacturing a fiber optic cable according to claim 36, said yarn including a coating system having a range of percentages by weight of about 0.7% to about 1.0%.

40. The method of manufacturing a fiber optic cable according to claim 36, the step of extruding the jacket being accomplished by a tube-on process.

41. The method of manufacturing a fiber optic cable according to claim 40, said step of tube-on extrusion further defining a space having a range of about 0.03 millimeters to about 1.0 millimeters, at the time of extrusion, disposed between said core and said jacket.

42. The method of manufacturing a fiber optic cable according to claim 36, further including the step of stranding said at least one optical fiber component around a central member.

43. The method of manufacturing a fiber optic cable according to claim 42, further including the step of stranding said at least one strength member around said at least one optical fiber component.

44. The method of manufacturing a fiber optic cable according to claim 36, said yarn further comprising a glass yarn.

45. A fiber optic cable, comprising:

at least one optical fiber component;

at least one strength member disposed adjacent to said at least one optical fiber component, said at least one strength member comprising a yarn;

said yarn including a coating system having a percentage by weight, based on the dry weight of said yarn, of about 2.0% or less;

a jacket generally surrounding said at least one optical fiber component and said at least one strength member; and said cable having a delta attenuation of about 0.3 dB or less over the range of about 0% fiber strain to about 1.0% fiber strain.

46. The fiber optic cable according to claim 45, said cable having a delta attenuation of about 0.2 dB or less over the range of about 0% fiber strain to about 0.6% fiber strain.

47. The fiber optic cable according to claim 45, said yarn including a coating system having a range of percentages by weight of about 0.3% to about 1.8%.

48. The fiber optic cable according to claim 45, said yarn including a coating system having a range of percentages by weight of about 0.5% to about 1.5%.

49. The fiber optic cable according to claim 45, said yarn including a coating system having a range of percentages by weight of about 0.7% to about 1.0%.

50. The fiber optic cable according to claim 45, further comprising a space having a range of about 0.03 millimeters to about 1.0 millimeters, at the time of extrusion, interposed between said at least one strength member and said jacket.

51. The fiber optic cable according to claim 45, said jacket is formed of a flame-retardant material.

52. The fiber optic cable according to claim 45, said at least one optical fiber component being selected from a tight-buffered fiber, an optical fiber ribbon or loose optical fiber.

53. A fiber optic cable, comprising:

at least one optical fiber component;

at least one strength member disposed adjacent to said at least one optical fiber component;

a jacket generally surrounding said at least one optical fiber component and said at least one strength member;

said cable having a delta attenuation of about 0.3 dB or less over the range of about 0% fiber strain to about 1.0% fiber strain; and said at least one optical fiber component and said at least one strength member comprising a cable core having a peak pull-out force of about 1 newton or less.

54. The fiber optic cable according to claim 53, said cable having a delta attenuation of about 0.2 dB or less over the range of about 0% fiber strain to about 0.6% fiber strain.

55. The fiber optic cable according to claim 53, said at least one strength member further comprising a yarn, said yarn including a coating system having a percentage by weight, based on the dry weight of said yarn, of about 2.0% or less.

56. The fiber optic cable according to claim 55, said yarn including a coating system having a range of percentages by weight of about 0.3% to about 1.8%.

57. The fiber optic cable according to claim 55, said yarn including a coating system having a range of percentages by weight of about 0.5% to about 1.5%.

58. The fiber optic cable according to claim 55, said yarn including a coating system having a range of percentages by weight of about 0.7% to about 1.0%.

* * * * *